United States Patent
Woehrle et al.

(10) Patent No.: US 10,411,816 B2
(45) Date of Patent: Sep. 10, 2019

(54) METHOD FOR SEARCHING A SPUR IN A SIGNAL RECEIVED AND DEVICE FOR SEARCHING A SPUR IN A SIGNAL RECEIVED

(71) Applicant: Rohde & Schwarz GmbH & Co. KG, Munich (DE)

(72) Inventors: Anke Woehrle, Amberg (DE); Matt Stehr, Aloha, OR (US); Berry Carone, Windsor, CA (US); Kay Gheen, Valdez, AK (US)

(73) Assignee: Rohde & Schwarz GmbH & Co. KG, Munich (DE)

( * ) Notice: Subject to any disclaimer, the term of this patent is extended or adjusted under 35 U.S.C. 154(b) by 164 days.

(21) Appl. No.: 15/365,616

(22) Filed: Nov. 30, 2016

(65) Prior Publication Data
US 2018/0152255 A1 May 31, 2018

(51) Int. Cl.
*H04B 10/079* (2013.01)
*H04B 17/318* (2015.01)

(52) U.S. Cl.
CPC .................... *H04B 17/318* (2015.01)

(58) Field of Classification Search
CPC . H04L 43/08; H04B 17/318; H04B 10/07953; H04B 10/0795; G01R 23/16; G01R 23/02; G01R 23/20; G01R 23/00
See application file for complete search history.

(56) References Cited

U.S. PATENT DOCUMENTS

| | | | | |
|---|---|---|---|---|
| 2,726,383 | A | * 12/1955 | Dunn | G01S 1/02 331/40 |
| 5,898,733 | A | * 4/1999 | Satyanarayana | H04L 45/48 375/133 |
| 6,233,288 | B1 | * 5/2001 | Takaoku | G01R 23/173 324/76.24 |
| 6,335,615 | B1 | 1/2002 | Gorin | |
| 7,292,947 | B1 | * 11/2007 | Tabatabaei | G01R 29/26 702/191 |
| 2003/0102979 | A1 | * 6/2003 | Jednacz | H04L 45/00 340/9.1 |
| 2008/0171560 | A1 | * 7/2008 | Olbers | H04W 12/12 455/456.6 |
| 2008/0298449 | A1 | * 12/2008 | Yokoyama | H04L 1/24 375/227 |
| 2009/0230980 | A1 | * 9/2009 | Williams | G01R 27/32 324/707 |
| 2010/0129074 | A1 | * 5/2010 | Gariepy | H04B 10/07953 398/26 |

(Continued)

FOREIGN PATENT DOCUMENTS

DE    10392151 B4    4/2013

*Primary Examiner* — Oanh Duong
(74) *Attorney, Agent, or Firm* — Schwabe, Williamson & Wyatt, P.C.

(57) ABSTRACT

A method for searching a spur in a signal received is described, wherein a fast sweep measurement with a high resolution bandwidth is performed in order to detect at least one spur. Further, a detailed sweep measurement with narrow resolution bandwidth is performed in order to analyze said spur detected. Said narrow resolution bandwidth needed for said detailed sweep measurement of said spur is determined automatically. Further, a device for searching a spur in a signal received is described.

14 Claims, 2 Drawing Sheets

(56) References Cited

U.S. PATENT DOCUMENTS

| | | | |
|---|---|---|---|
| 2011/0091206 A1* | 4/2011 | He | H04B 10/07953 398/26 |
| 2012/0065983 A1* | 3/2012 | Ekstrand | G10L 21/038 704/500 |
| 2012/0093501 A1* | 4/2012 | He | H04B 10/07953 398/26 |
| 2012/0263393 A1* | 10/2012 | Yahil | G06T 5/002 382/264 |
| 2013/0158923 A1* | 6/2013 | Stanton | G01R 13/0254 702/76 |
| 2014/0355459 A1* | 12/2014 | Rafique | H04B 1/0475 370/252 |
| 2015/0015238 A1* | 1/2015 | Wertz | G01R 23/16 324/76.19 |

\* cited by examiner

METHOD FOR SEARCHING A SPUR IN A SIGNAL RECEIVED AND DEVICE FOR SEARCHING A SPUR IN A SIGNAL RECEIVED

TECHNICAL FIELD

The invention relates to a method for searching a spur in a signal received and a device for searching a spur in a signal received.

BACKGROUND OF THE INVENTION

Spurs, also called spurious emissions and/or spurious signals, are signals at arbitrary frequencies wherein these frequencies do not belong to the carrier signal (desired signal) having a certain frequency. Accordingly, harmonics of that carrier signal having frequencies at an integer multiple of the frequency of the carrier signal can be considered as specific spurs. Further, oscillations and/or mixing terms also correspond to spurs wherein these spurs have frequencies at a non integer multiple of the frequency of the carrier signal. Generally speaking, spurs are signals having unwanted frequencies.

Further, the amplitudes of the spurs are small compared to the amplitude of the fundamental, namely the carrier signal. Thus, the amplitudes of the spurs are usually near the noise floor level of the signal received which impairs the measurement accuracy of the spurs as the resolution has to be very high in order to resolve these spurs.

In the prior art, different techniques are known to search for spurs in a signal received in order to identify the locations of the spurs in a frequency-domain diagram, in particular their frequencies. As already mentioned above, the frequencies of the spurs are not known aside from the frequencies of the (also unwanted) harmonics being integer multiples of the frequency of the signal received. Thus, the whole frequency range of the signal received is typically scanned with high sensitivity in order to determine the frequencies of the spurs due to their low amplitudes. The high sensitivity scan is established by using narrow resolution bandwidths (RBW) while sweeping across the whole frequency range of the signal received. This measurement is also called radio frequency sweep. However, the time needed for scanning the whole frequency range is very high when using a narrow resolution bandwidth. Nevertheless, the narrow resolution bandwidth is required in order to resolve the spurs having amplitudes being close to the noise floor level.

Accordingly, there is a need for searching a spur in a signal received in an efficient and fast manner.

SUMMARY OF THE INVENTION

The invention provides a method for searching a spur in a signal received, comprising the following steps:
a) Performing a fast sweep measurement with a high resolution bandwidth in order to detect at least one spur,
b) Performing a detailed sweep measurement with a narrow resolution bandwidth in order to analyze said spur detected, wherein
said narrow resolution bandwidth needed for said detailed sweep measurement of said spur is determined automatically.

Further, the invention provides a device for searching a spur in a signal received, comprising at least one input for receiving a signal to be analyzed and a processing unit that is configured to perform sweep measurements wherein said processing unit is further configured to automatically determine a narrow resolution bandwidth needed for a detailed sweep measurement in order to detect at least one spur in a signal received.

The invention is based on the finding that a two step approach for searching a spur in a signal received reduces the total time for searching the spur provided that the narrow resolution bandwidth used in the detailed sweep measurement is determined automatically such that no manual interaction is required being time-consuming. In the fast sweep measurement, the location of the at least one spur is determined roughly whereas the at least one spur are analyzed in detail in the detailed sweep measurement, in particular its amplitude, frequency and bandwidth. According to the two step approach, two passes, namely two different sweep measurements, are performed which have different measurement configurations and test limits. In the first step, the whole frequency range of the signal received is measured using oversweeping and a high resolution bandwidth. This first step is very fast due to the high resolution bandwidth used. In addition, the locations of the at least one spur can be identified roughly, in particular its frequency in the frequency range. However, the high resolution bandwidth produces different errors regarding the detection of the spur which cannot be corrected appropriately by using mathematical means. Therefore, the second step (detailed sweep measurement) is required in order to accurately identify the at least one spur in the signal received in detail, in particular its properties like amplitude, frequency and bandwidth. The second pass using the narrow resolution bandwidth ensures that different spurs being close to each other can be distinguished, in particular spurs having a frequency at a non integer multiple of the carrier frequency with respect to the harmonics. As already mentioned, the spurs identified in the first step (first pass) are measured separately in the second step (second pass) again wherein the detailed sweep measurement (second step) is automatically configured for accurate measurements. Since the settings for the detailed sweep measurement (second step), in particular the value of the narrow resolution bandwidth, are provided automatically, no manual input of a user is required. Thus, the user does not need to configure certain detailed sweep measurements as the detailed sweep measurements are configured automatically which increases the efficiency while reducing the total time needed for the measurement.

According to an aspect, a noise floor level is determined while performing said fast sweep measurement. The noise floor level of the signal received corresponds to a displayed average noise level (DANL) which is shown on a display of the device.

In general, the noise floor level determined in the fast sweep measurement (first pass) can be used for the detailed sweep measurement which is performed subsequently to the fast sweep measurement in order to analyze the at least one spur in detail.

Particularly, said noise floor level is used for determining said narrow resolution bandwidth. Depending on the noise floor level determined in the fast sweep measurement (first pass), the narrow resolution bandwidth for the detailed sweep measurement is determined automatically such that the at least one spur having an amplitude close to the noise floor level can be identified accurately, in particular its properties. For instance, an equation for the narrow resolution bandwidth is used wherein the noise floor level is a parameter. As already mentioned, spurs being close to each other can be resolved appropriately in the detailed sweep measurement due to the narrow resolution bandwidth.

In general, using a narrow resolution bandwidth lowers the displayed average noise level and further increases the dynamics range of the device yielding to an improved sensitivity of the method for searching at least one spur as well as of the device.

Beside the value of the resolution bandwidth, further settings can be adjusted automatically for the detailed sweep measurement such as an attenuating value of an input attenuator and/or the amplification of a preamplifier. The input attenuator and the preamplifier may be part of the device. Generally, both components can be used to lower the floor noise level such that the resolution of low level signals is improved, in particular the resolution of the at least one spur with respect to the signal received.

According to another aspect, at least one span to be analyzed in detail is automatically determined. The span is a portion of the whole frequency range of the signal received. Thus, only at least one certain cut-out of the whole frequency range is analyzed in detail for identifying the corresponding spur. The time needed for the measurement can be reduced appropriately.

Particularly, said at least one span is selected such that said at least one spur detected is within said span. During the fast sweep measurement, the location of the spur is determined roughly, in particular its frequency. The span used for the detailed sweep measurement is provided such that the location determined roughly in the fast sweep measurement lies within said span. Preferably, the span is selected such that the spur detected in the fast sweep measurement is located in the middle of the span used for the detailed sweep measurement.

Further, said span may have a frequency range corresponding to the harmonics of the signal received. Accordingly, the limits of the at least one span are selected such that no harmonics are within the span. For instance, the span starts at a frequency being higher than a certain harmonic and it ends at a frequency being lower than the next harmonic in order to ensure that no harmonic is located within the span being used for the detailed sweep measurement.

Several spans may be used for the detailed sweep measurement. For instance, the several spans can reach in total from the fundamental to the tenth harmonic in order to ensure that all spurs detected in the signal received can be analyzed in detail.

According to an aspect, said processing unit is at least part of a digital processing unit. Thus, the data received by the processing unit can be processed in a digital manner which provides advantages in comparison to analog processing, in particular with regard to the sweeping speed and performance. Therefore, the total time for identifying a spur can be decreased. The digital processing unit may comprise further digital components. Thus, the digital processing unit may be a higher-ranking unit with respect to the processing unit. Alternatively, the processing unit is implemented in the digital processing unit.

According to another aspect, said device comprises an adjustable digital resolution bandwidth filter. The resolution bandwidth can be adjusted easily by using such an adjustable filter. In general, digital filters maintain full accuracy with regard to amplitude and frequency and they have a better shape factor in comparison to analog filters.

Said device may be a spectrum or signal analyzer. Generally, a spectrum analyzer or a signal analyzer is used for analyzing the spectrum of a signal received. Thus, the spurs in a signal received can also be detected by these analyzers.

Particularly, said device is a swept-tuned spectrum or signal analyzer. Accordingly, a broadband spectrum can be analyzed by the spectrum or signal analyzer wherein the at least one spur can be searched in the whole broadband spectrum.

Further, said device may be configured to perform a method as mentioned above. Thus, the device is configured to search for at least one spur in an efficient and fast manner.

BRIEF DESCRIPTION OF DRAWINGS

The invention will now be described with reference to a preferred embodiment which is shown in the drawings. In the drawings, FIG. 1 schematically shows a device for searching a spur in a signal according to an embodiment the invention, and FIG. 2 schematically shows a frequency-domain diagram.

DETAILED DESCRIPTION

Figure 1:
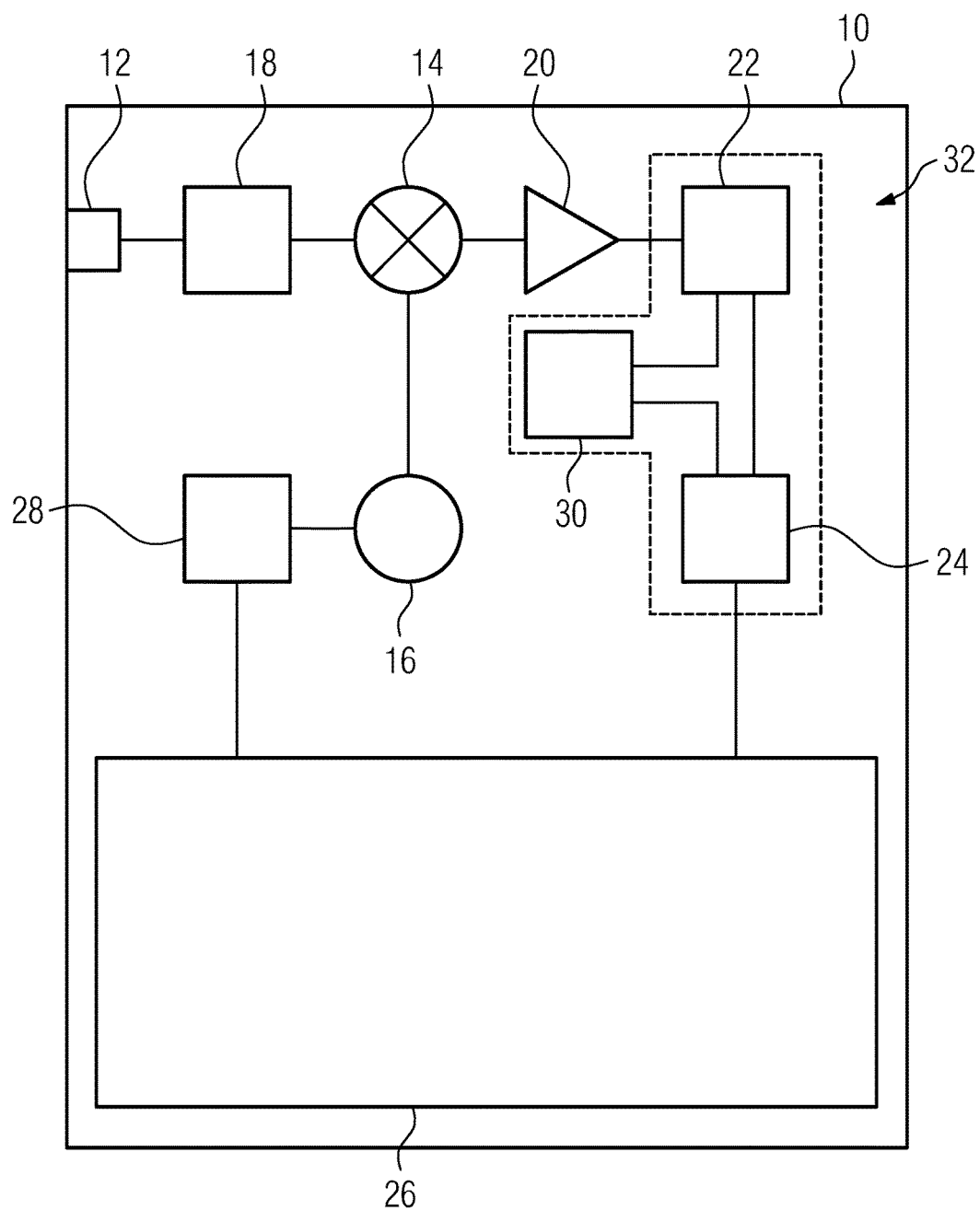

In FIG. 1, a device 10 is shown having a radio frequency input 12 for receiving a signal to be analyzed wherein the device 10 is configured to search for spurs in the signal received via the input 12.

The device 10 comprises a mixer 14 which is connected to the input 12 as well as to a tunable local oscillator 16 being a voltage controlled oscillator, for instance.

Further, an input attenuator 18 is shown which is positioned between the input 12 and the mixer 14 such that the radio frequency signal received via the input 12 is attenuated before it is processed, in particular converted by the mixer 14. The input attenuator 18 can also be called radio frequency attenuator.

The output of the mixer 14 is connected with a preamplifier 20 that is used to amplify the converted signal before it is received by a resolution bandwidth filter 22 (RBW filter). The resolution bandwidth filter 22 is also called bandpass filter or intermediate frequency filter (IF filter).

Generally spoken, the resolution bandwidth filter 22 defines a window for the signal received.

In the shown embodiment, the resolution bandwidth filter 22 may be an adjustable digital resolution bandwidth filter 22 such that the resolution bandwidth can be adjusted easily as will be explained later.

The device 10 also comprises a detector unit 24 which is connected to the output of the resolution bandwidth filter 22. The detector unit 24 may at least comprise an envelope detector. In general, the detector unit 24 is configured to digitize the signal provided by the resolution bandwidth filter 22. Thus, the detector unit 24 comprises at least an analog-to-digital converter (ADC converter).

Moreover, the detector unit 24 may comprise a filter, in particular a video filter or a low-pass filter. This filter is typically located between the envelope detector and the analog-to-digital converter. The bandwidth of this filter can also be set which is called video bandwidth (VBW).

For displaying purposes, the device 10 has a display 26 that is connected to the detector unit 24 such that a diagram, in particular the frequency-domain trace, can be generated and then displayed on the display 26 in order to illustrate the results to a user of the device 10.

The device 10 further comprises a sweep generator 28 that controls the local oscillator 16. The sweep generator 28 also synchronizes the local oscillator 16 and the diagram displayed on the display 26.

Furthermore, a processing unit 30 is provided that is connected to the resolution bandwidth filter 22 and the detector unit 24. As already mentioned, the detector unit 24 is configured to analyze the signal provided by the resolution bandwidth filter 22. Accordingly, a noise floor level can be determined by the detector unit 24 which may be used for adjusting the resolution bandwidth filter 22 as will be described hereinafter with reference to FIG. 2 which shows a diagram which may be displayed on the display 26 when a method for searching a spur in the signal received is performed. Accordingly, the device 10 is configured to perform the method described hereinafter.

In general, the detector unit 24, the resolution bandwidth filter 22 and the processing unit 30 establish a digital processing unit 32.

The method for searching at least one spur in the signal received via the input 12 is a two-stage search wherein a fast sweep measurement (first pass) is performed with a high resolution bandwidth (RBW). Thus, a fast scan of the whole frequency range is performed due to the high resolution bandwidth in order to roughly identify the locations of spurs within the signal received. However, the fast sweep measurement does not provide sufficient accurate information of the spurs, in particular regarding their properties such as amplitude, frequency and/or bandwidth, since errors regarding these properties occur. Furthermore, these errors occurring in the fast sweep measurement cannot be corrected in a mathematical manner.

Thus, a second sweep measurement (second pass) has to be performed in order to gather accurate information of the spurs in the signal received, in particular their properties.

The second sweep measurement is a detailed sweep measurement which is performed by using a narrow resolution bandwidth. The value of the narrow resolution bandwidth is determined automatically by the device 10, in particular its processing unit 30, since the noise floor level of the signal received is already obtained in the fast sweep measurement wherein this noise floor level is a parameter for determining the narrow resolution bandwidth needed for the detailed sweep measurement. Accordingly, the value of the narrow resolution bandwidth is derived from the noise floor level determined in the fast sweep measurement.

Thus, the processing unit 30 separately shown illustrates the function of the device to determine the narrow resolution bandwidth automatically. Nevertheless, the processing unit 30 can be implemented in the digital processing unit 32.

Beside the narrow resolution bandwidth, the processing unit 30 may also automatically determine a span which is used for the detailed sweep measurement. The span is a portion of the whole frequency range which is analyzed in detail. Thus, the time needed for the detailed sweep measurement can be reduced further since only a certain portion is analyzed in detail.

Particularly, the spans are selected according to the positions of the spurs determined roughly in the fast sweep measurement. For instance, the spans (portions of the frequency range) are selected such that the roughly determined positions are within the spans to be analyzed in detail ensuring that the exact locations, in particular the frequencies, of the spurs can be identified. Preferably, the locations of the spans determined roughly are in the middle of each span used for the detailed sweep measurement.

Further, the amplitude and the bandwidth of the spurs are also identified accurately or rather analyzed in detail in the detailed sweep measurement.

The detailed sweep measurement may be performed with so-called "auto-coupled sweeptime" which automatically chooses the fastest allowable sweeptime based upon the span and resolution bandwidth.

Since the span and the resolution bandwidth are automatically determined based upon the fast sweep measurement, the detailed sweep measurement is a full automatic measurement step wherein no manual interaction is required. Particularly, the configuration is done by the processing unit 30 automatically which is connected with the detector unit 24 detecting inter alia the noise floor level in the fast sweep measurement.

As no manual interaction is needed to configure the device 10 for the detailed sweep measurement, the total time for the sweep measurement in order to detect spurs can be reduced dramatically.

The device 10 shown in FIG. 1 is a swept-tuned spectrum or signal analyzer ensuring a broadband analysis of the signal received.

Figure 2:
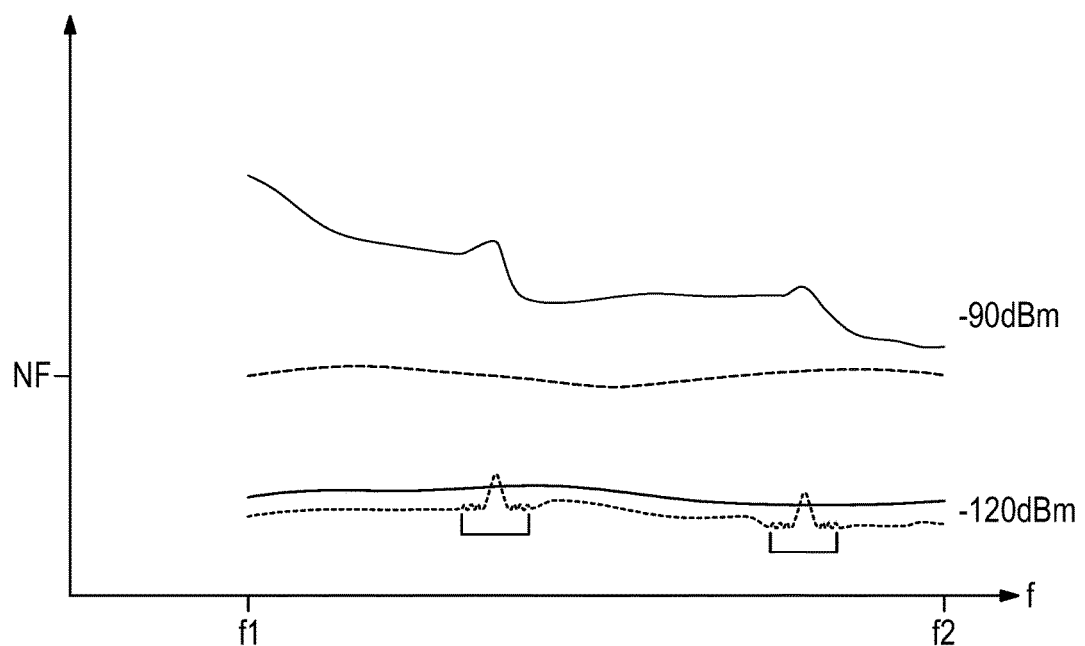

In FIG. 2, exemplary measurements are shown in a frequency-domain diagram which can be displayed on display 26, namely a fast sweep measurement and a detailed sweep measurement.

As can be seen, the displayed average noise level (DANL) is lowered for the detailed sweep measurement due to the narrow resolution bandwidth. Particularly, the displayed average noise level (DANL) being the noise floor level is reduced from −90 dBm (fast sweep measurement) to −120 dBm (detailed sweep measurement) ensuring that spurs being close to the noise floor level can be identified appropriately.

Furthermore, two different frequencies f1, f2 are indicated on the horizontal axis (x-axis) in the diagram which may relate to the fundamental and the first harmonic of the carrier signal (wanted signal).

Thus, the span used for the analysis in the detailed sweep measurement starts at a frequency being higher than the fundamental or a certain harmonic (frequency f1) and ends at a frequency being lower than the next harmonic indicated by f2. Accordingly, it is ensured that the fundamental as well as the harmonics are not analyzed in the detailed sweep measurement since the random spurs are of more interest due to the fact that it is difficult to filter these random spurs having frequencies at non integer multiples of the frequency of the wanted signal.

Alternatively to the tunable local oscillator 16, a bandpass filter being configured to sweep across a frequency range of interest can be used for ensuring the sweeping function.

Generally, the search for spurs in the signal received is improved, in particular with regard to the time needed. The automatic two-stage measurements comprising a fast sweep measurement with a high resolution bandwidth for roughly identifying spurs in the whole frequency range and the detailed sweep measurement with a narrow resolution bandwidth for gathering accurate information of the spurs reduces the search time dramatically with respect to a complete search using a narrow resolution bandwidth. Since the narrow resolution bandwidth is determined fully automatically resulting in a fully automatic configuration of the detailed sweep measurement, the total time needed for the search is decreased as no manual interaction is required.

Furthermore, the risk of failure with regard to the configuration of the detailed sweep measurement is minimized.

The invention claimed is:

1. A method for searching a spur in a signal received, comprising the following steps:

performing a fast sweep measurement with a high resolution bandwidth in order to detect at least one spur, and performing a detailed sweep measurement with a narrow resolution bandwidth subsequently to the fast sweep measurement so that an approach comprising at least two steps is provided, wherein the detailed sweep measurement is performed in order to analyze said spur detected in more detail, wherein said narrow resolution bandwidth needed for said detailed sweep measurement of said spur is determined automatically based on the at least one spur detected during the fast sweep measurement.

2. The method according to claim 1, wherein at least one span to be analyzed in detail is automatically determined.

3. The method according to claim 2, wherein said at least one span is selected such that said at least one spur detected is within said span.

4. The method according to claim 2, wherein said span has a frequency range corresponding to the harmonics of the signal received.

5. The method according to claim 1, wherein a noise floor level is determined while performing said fast sweep measurement.

6. The method according to claim 5, wherein at least one span to be analyzed in detail is automatically determined.

7. The method according to claim 6, wherein said at least one span is selected such that said at least one spur detected is within said span.

8. The method according to claim 6, wherein said span has a frequency range corresponding to the harmonics of the signal received.

9. The method according to claim 5, wherein said noise floor level is used for determining said narrow resolution bandwidth.

10. The method according to claim 9, wherein at least one span to be analyzed in detail is automatically determined.

11. The method according to claim 10, wherein said at least one span is selected such that said at least one spur detected is within said span.

12. The method according to claim 10, wherein said span has a frequency range corresponding to the harmonics of the signal received.

13. A spectrum or signal analyzer for searching for at least one spur in a received signal, comprising:
a hardware processor configured to:
perform a fast sweep measurement with a high resolution bandwidth in order to detect the at least one spur, and
perform a detailed sweep measurement with a narrow resolution bandwidth subsequently to the fast sweep measurement so that an approach comprising at least two steps is provided, wherein the detailed sweep measurement is performed in order to analyze said at least one spur detected in more detail, wherein said narrow resolution bandwidth needed for said detailed sweep measurement of said spur is determined automatically based on the at least one spur detected during the fast sweep measurement.

14. A method for searching a spur in a signal received, comprising the following steps:
performing a fast sweep measurement with a high resolution bandwidth in order to detect the a location of the at least one spur roughly, and
performing a detailed sweep measurement with a narrow resolution bandwidth subsequently to the fast sweep measurement so that an approach comprising at least two steps is provided since two different sweep measurements are performed having at least one of different measurement configurations and test limits, wherein the detailed sweep measurement is performed in order to analyze said spur detected in detail, wherein said narrow resolution bandwidth needed for said detailed sweep measurement of said spur is determined automatically based on the location of the at least one spur detected with the fast sweep measurement.

* * * * *